Figure 1:
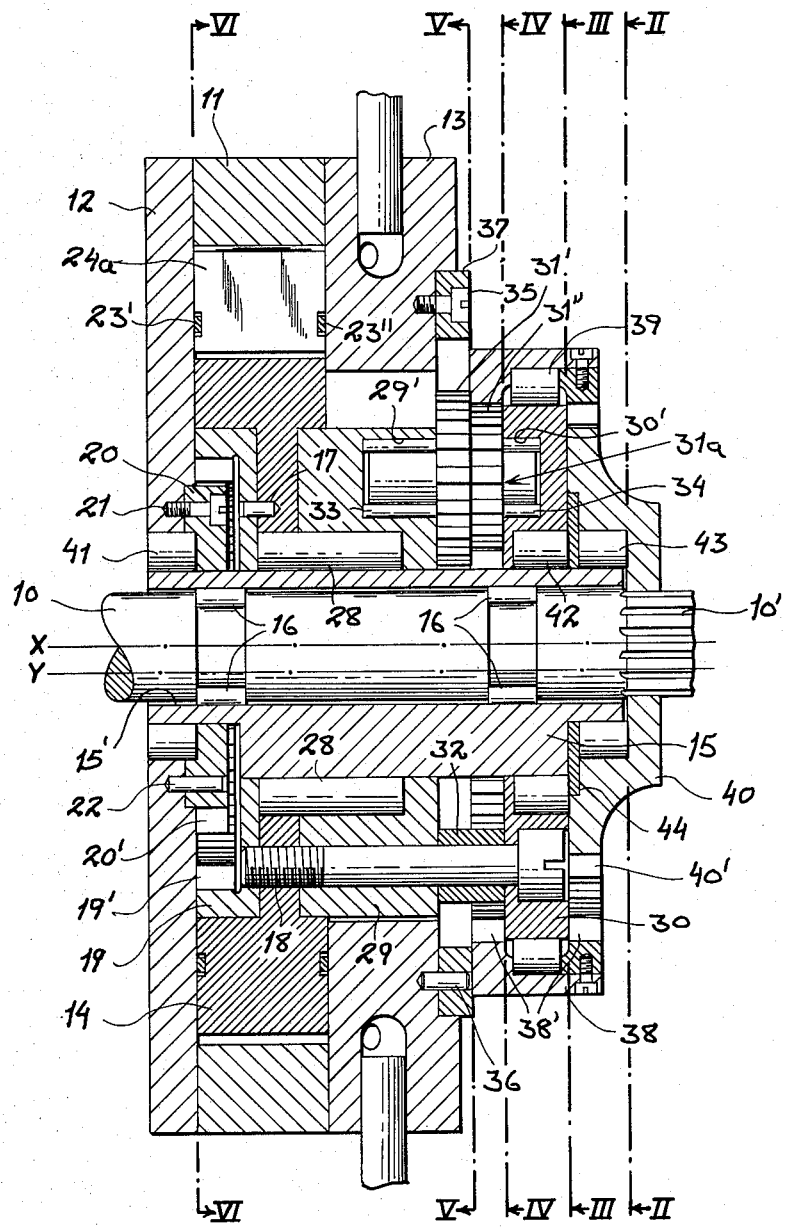
Figure 2:
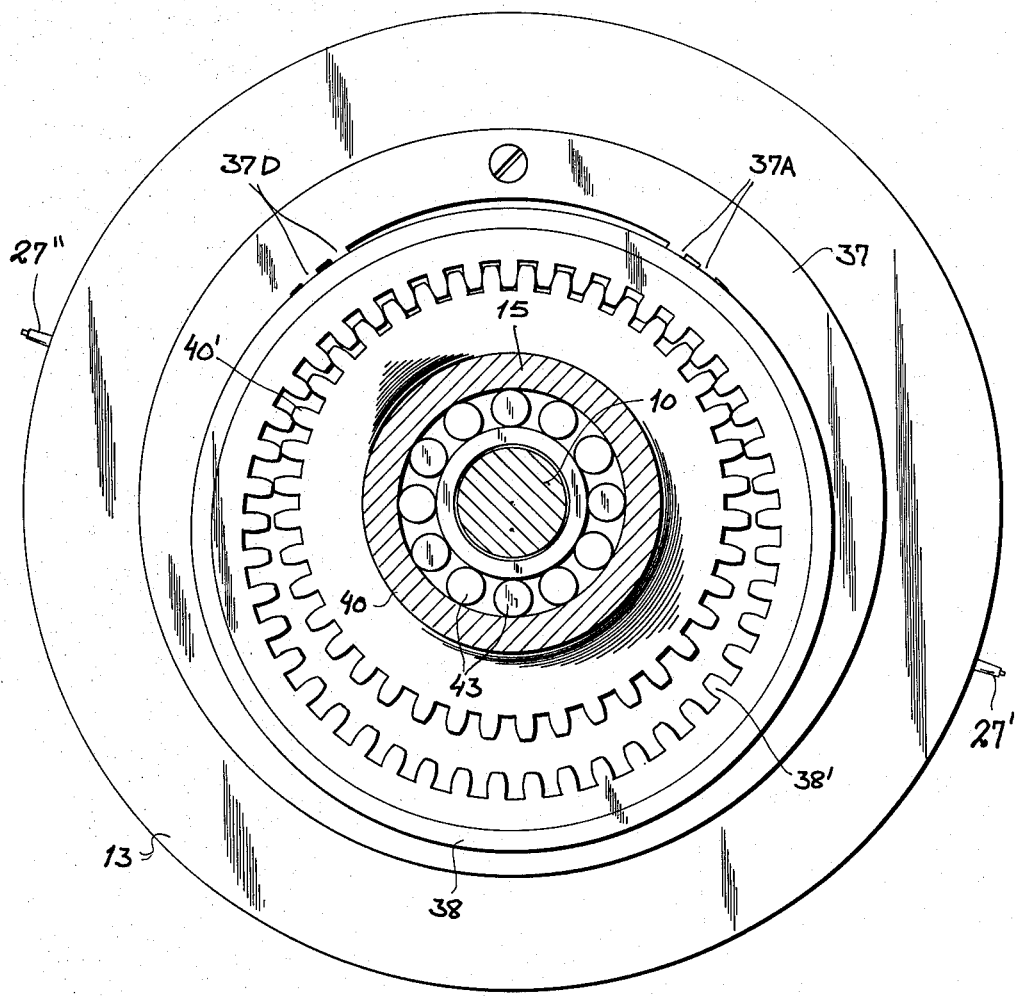
Figure 3:
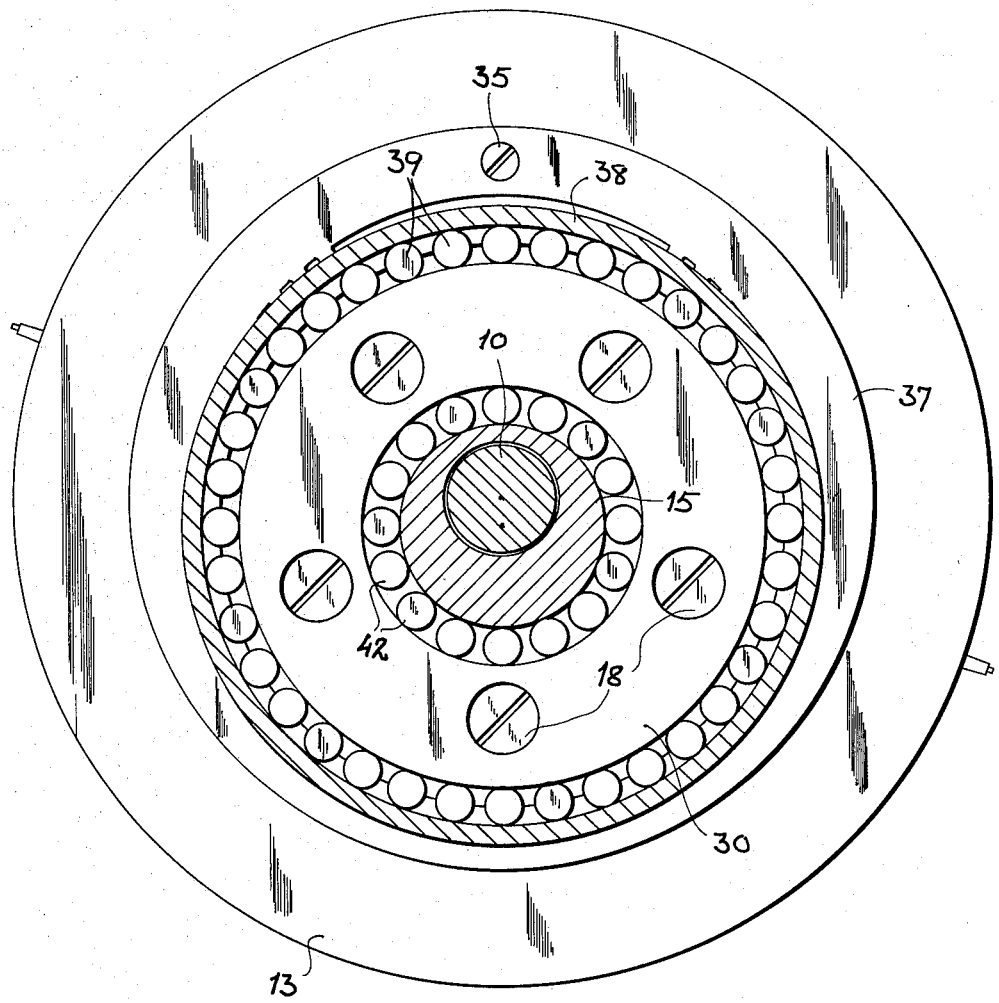
Figure 4:
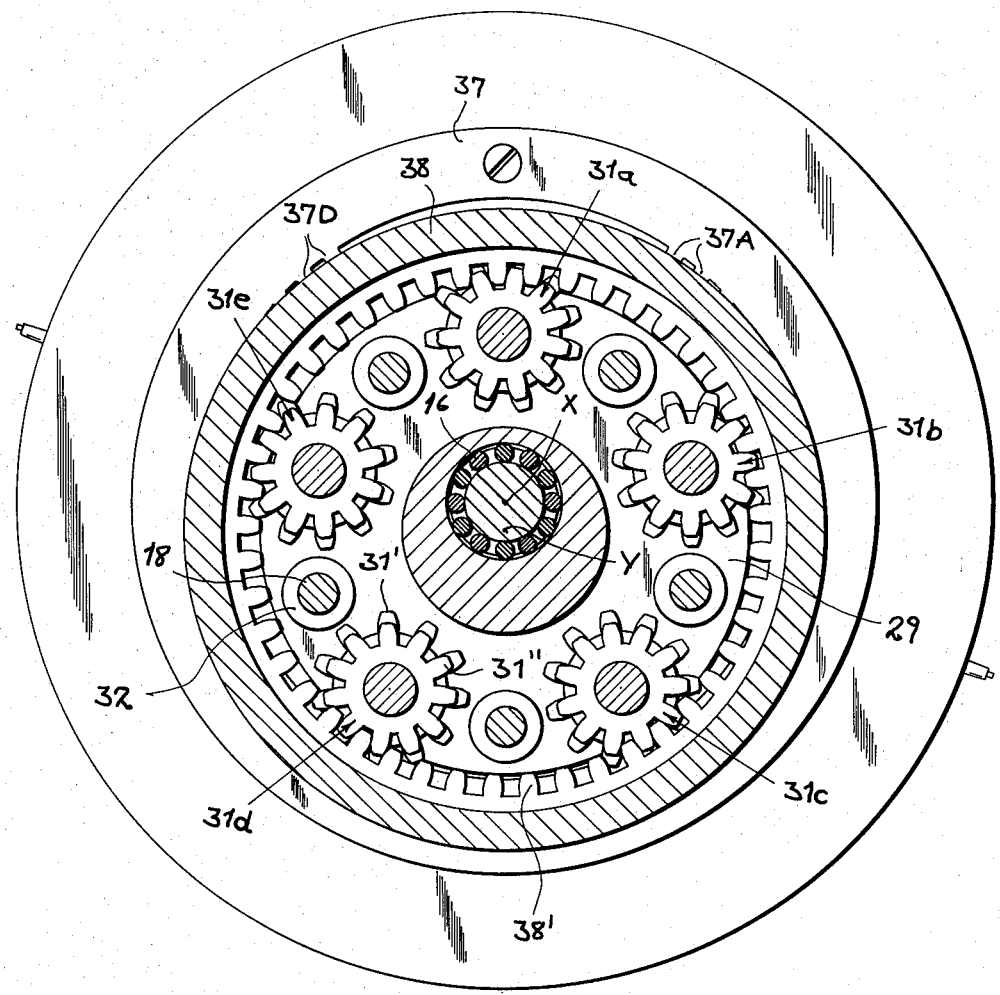

April 5, 1966     P. LAUDET     3,244,155
ROTARY ENGINE WITH TWO CONCENTRIC ROTORS
Filed May 28, 1965     9 Sheets-Sheet 1

Pierre Laudet
INVENTOR.

BY Karl F. Ross
Attorney

Pierre Laudet
INVENTOR.

BY Karl F. Ross
Attorney

United States Patent Office 3,244,155
Patented Apr. 5, 1966

3,244,155
ROTARY ENGINE WITH TWO CONCENTRIC ROTORS
Pierre Laudet, 53 Rue de St. Prix, Saint-Leu-la-Foret, France
Filed May 28, 1965, Ser. No. 459,837
12 Claims. (Cl. 123—8)

This application is a continuation-in-part of my application Ser. No. 256,585 filed February 6, 1963.

My present application relates to a rotary engine of the type in which an outer rotor, an inner rotor and an eccentric support for the latter are all rotatable relatively to one another, the angular velocities of the outer rotor and the inner rotor with reference to the support being in a ratio of $(n+1):n$.

The principle of such engines is well known per se, e.g. from U.S. Patent No. 2,988,065 to Wankel et al. According to this principle, the outer rotor has an inner peripheral wall formed with $n$ peripherally equispaced lobes of generally epitrochoidal configuration coacting with $n+1$ corners of a polygonal outer peripheral wall of the inner rotor. With every relative rotation of the outer rotor and the support through 360°, the inner rotor lags with reference to the outer rotor by $$\frac{360°}{n+1}$$

so that each corner of the inner rotor sweeps the $$[n/(n+1)]^{\text{th}}$$

part of a lobe. Owing to the eccentricity of the support, these corners are constrained to follow the epitrochoidal curvature of the lobes so that the interior of the outer rotor is effectively subdivided into $n+1$ chambers isolated from one another.

The designations "inner rotor" and "outer rotor" are generally employed even in those instances in which one or the other of these rotors is held stationary. With the outer rotor fixed, for example, the eccentric support performs a complete revolution while the inner rotor advances through an arc of $$\frac{360°}{n+1}$$

Since this arc corresponds to the angular spacing of successive corners of the inner rotor (whose periphery is assumed to be a regular polygon), the relative position of the two rotors and the support after one such revolution is geometrically identical with that previously occupied by these elements. It will thus be convenient to define as an engine cycle the relative rotation of 360° between the outer rotor and the support.

In the course of such an engine cycle, the effective volume of each of the $n+1$ chambers encompassed between the inner periphery of the outer rotor and a pair of adjacent corners of the outer periphery of the inner rotor varies between a maximum and a minimum, returning to its original value after $n+1$ cycles (i.e. after a complete revolution of the inner rotor relative to the outer rotor). This periodic increase and decrease in volume can thus be made to coincide with the admission and the expulsion of a working fluid into and from some or all of these chambers, e.g. of a liquid or gas to be pumped or of an explosive mixture which by its combustion maintains and accelerates the relative motion of the elements. Specifically, in an internal-combustion engine of this type, the working fluid may be introduced in the region of one lobe and, after ignition and combustion, may be discharged in the region of another lobe after the system has passed through a position in which the chamber containing the fluid was reduced to its minimum size, this reduction occurring when the two polygonal corners bounding the chamber are symmetrically disposed on opposite sides of a radius defining the junction between two adjacent lobes.

An object of my invention is to provide improved means for the transmission of torque between the rotating elements of the system just described and an associated power shaft, i.e. an input shaft in the case of a pump or an output shaft in the case of an internal-combustion engine.

A more particular object of my invention is to provide torque-transmitting means enabling the power shaft to be centered on the axis of the outer rotor, this arrangement being especially advantageous when the outer rotor is held stationary with reference to adjacent housing portions forming therewith a closed shell around the inner rotor.

A further object, allied with the preceding one, is to provide an engine of the character set forth whose power shaft axially traverses the rotors so that either or both ends of the shaft are available for the transmission of torque.

It is also an object of this invention to provide means for so synchronizing the rotation of the power shaft with that of the rotors that the shaft turns with reference to the outer rotor at the same speed as the inner rotor, albeit in an opposite sense relative thereto.

In accordance with my present invention there is provided in a rotary engine of the aforedescribed character a torque-transmitting system coupling its inner rotor with a power shaft which is centered upon the axis of the outer rotor, i.e. an axis parallel to but offset from that of the inner rotor, this system including a circular array of $n+1$ planetary gears which are mounted on the inner rotor for independent rotation and are centered on its axis; an annular gear on the outer rotor, centered on the axis of the latter, is positioned for staggered cooperation with the planetary gears upon relative rotation of the two rotors, the planetary gears in turn meshing with the ring gear which is centered on the axis of the inner rotor and is coupled, advantageously through the intermediary of a further gear, with the power shaft.

The annular gear carried by the outer rotor need not be continuous but may be subdivided into a plurality of angularly spaced toothed arc segments which are aligned with respective lobes of the outer rotor and centered on the regions of greatest depth of these rotors.

In the case of a pentagonal rotor ($n=4$), it is possible to use alternate lobes for the introduction of an explosive mixture and the remaining lobes for the exhaustion of the combustion products so that, with each chamber operating in a four-stroke Otto cycle, there will be two explosions per chamber during each engine cycle (as defined above) with a total of ten explosions in the course of a complete relative revolution of the two rotors.

The tooth ratio of the various gears referred to is preferably so chosen, according to a further feature of my invention, that the power shaft and the inner rotor move at equal and opposite speeds with reference to the outer rotor, thus at equal absolute rates of rotation when the outer rotor is held stationary. An advantage of this arrangement is that the power shaft can be conveniently used for the control of contacts and/or valves designed to regulate the circulation of working fluid and/or the operation of an igniter (in the case of an internal-combustion engine) in timed relationship with the displacement of the inner rotor. To this end, according to a more specific feature of my invention, each of the planetary gears has toothed portions of like pitch in mesh with the free-floating ring gear and with the (continuous or segmented) annular gear of the outer rotor, respectively, the pitch of these toothed portions being twice that of the aforementioned further gear on the power shaft which meshes with the ring gear.

Figure 5:
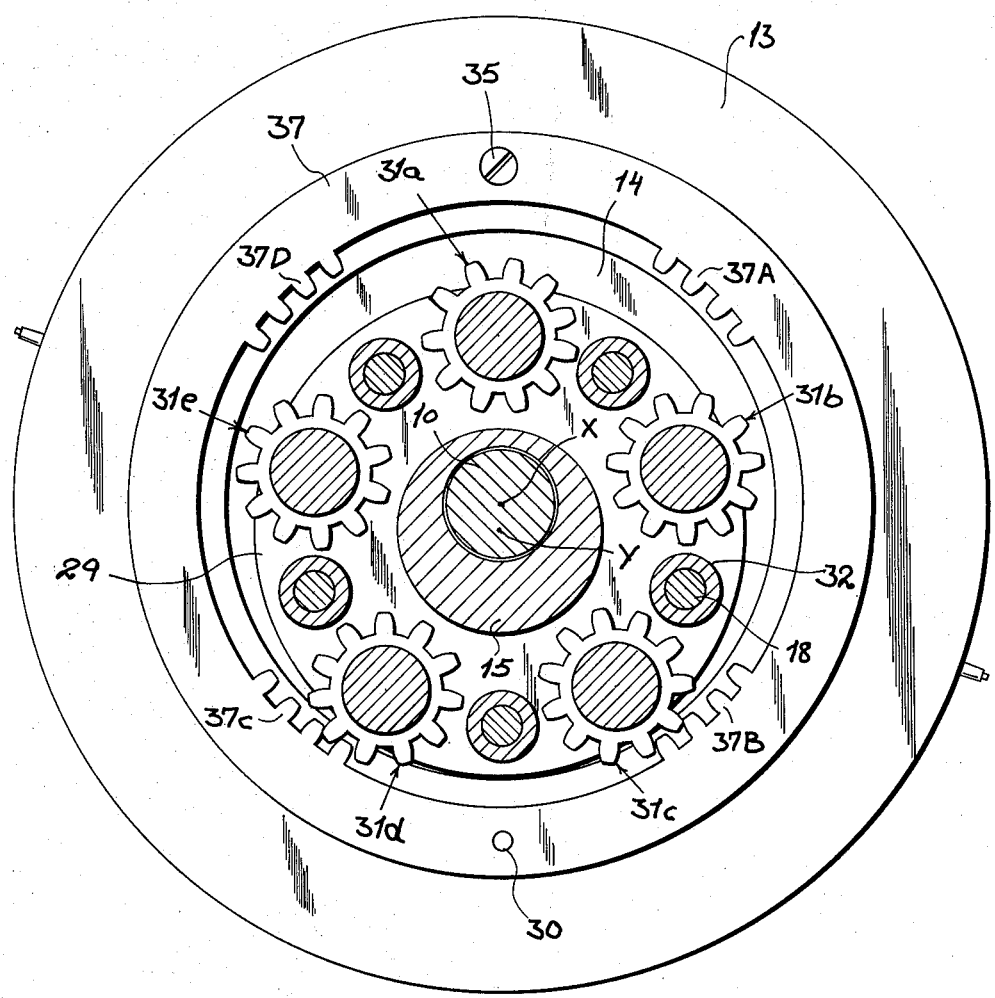
Figure 6:
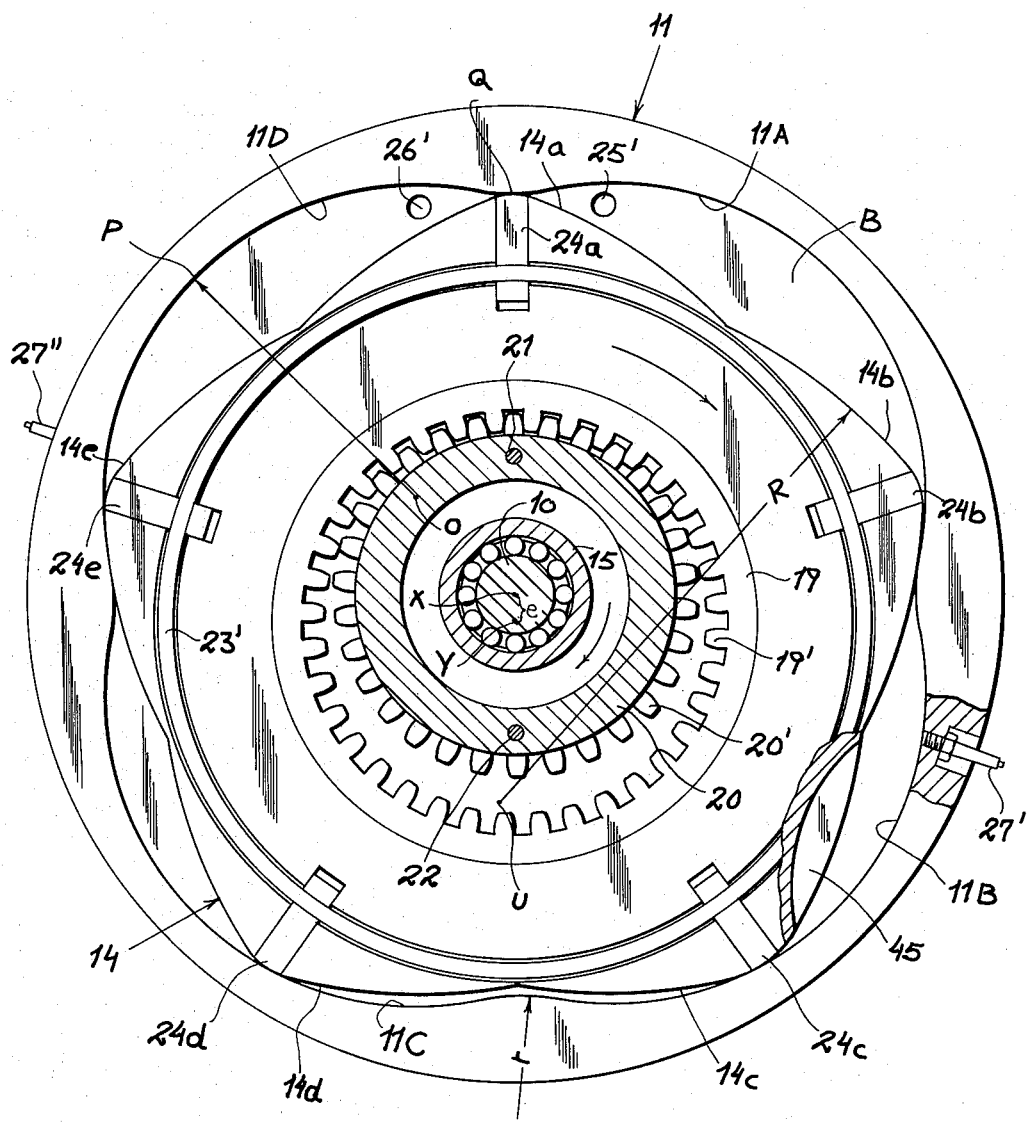
Figure 6B:
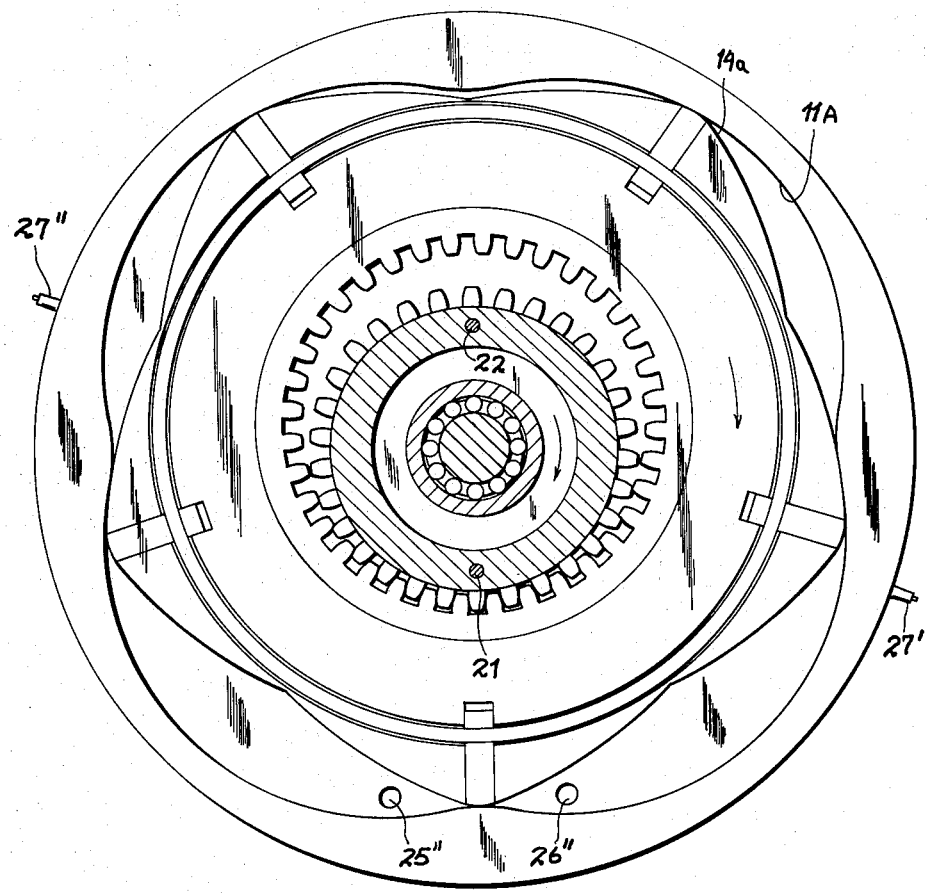
Figure 6A:
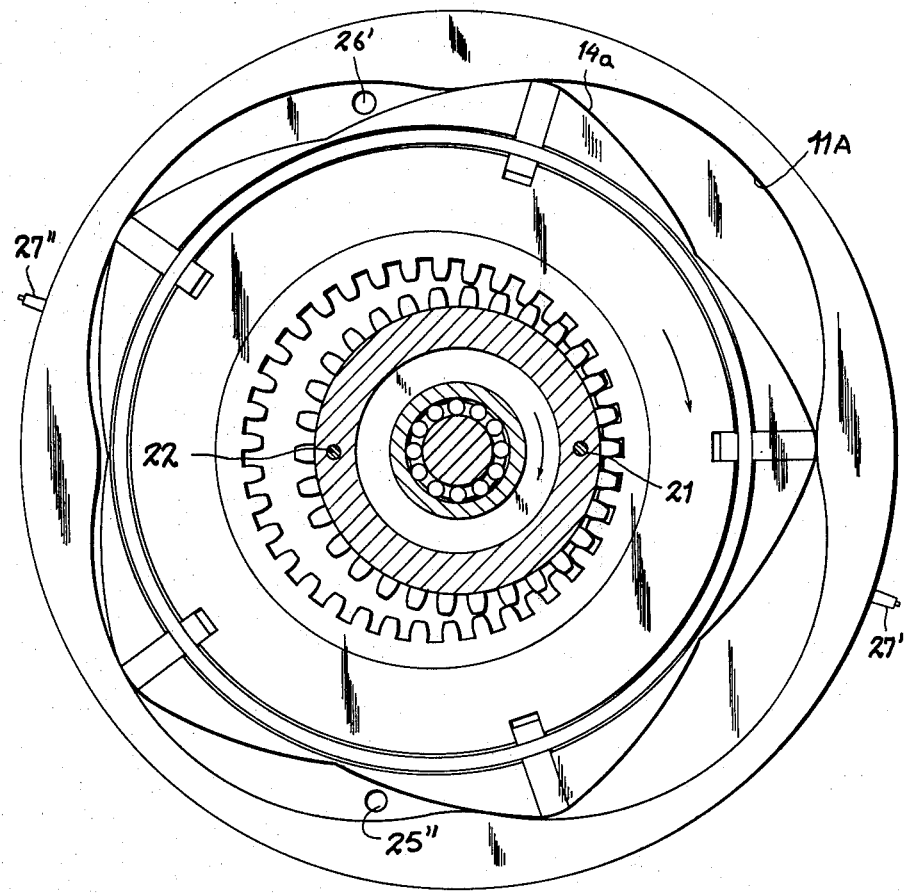
Figure 6C:
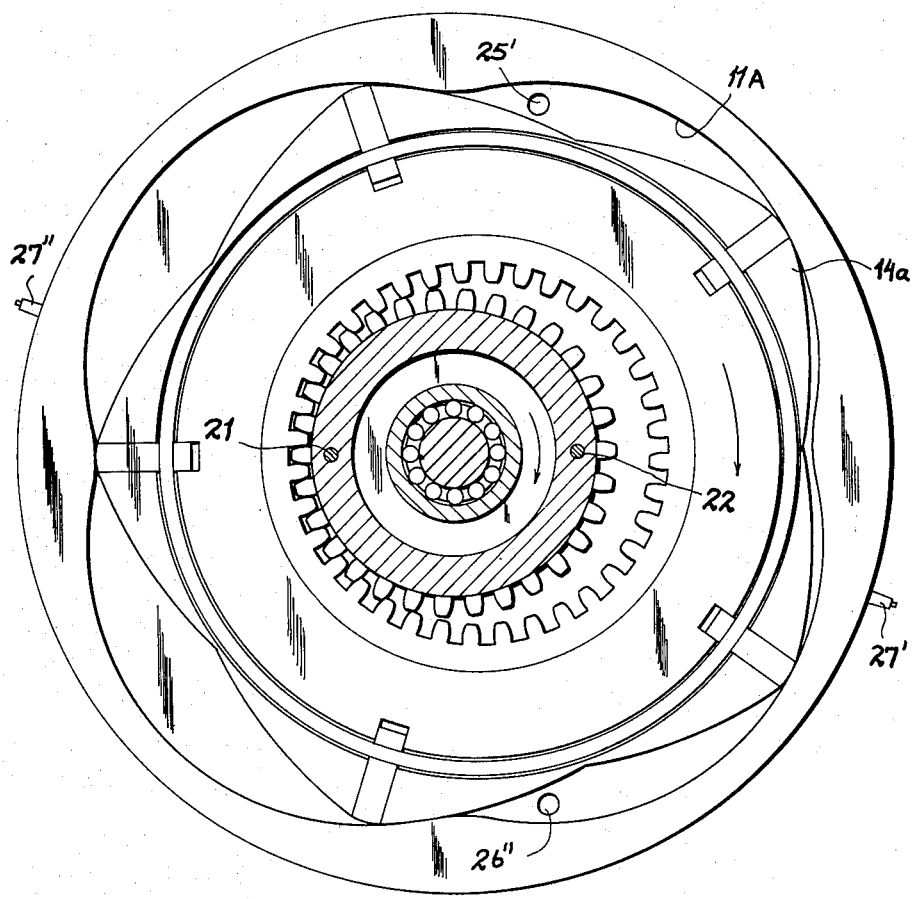

The invention will be described hereinafter in greater detail, reference being made to the accompanying drawing in which:

FIG. 1 is a cross-sectional view of an internal-combustion engine embodying the invention;

FIGS. 2, 3, 4, 5, and 6 are cross-sectional views taken on the lines II—II, III—III, IV—IV, V—V and VI—VI, respectively, of FIG. 1; and FIGS. 6A, 6B and 6C are views similar to FIG. 6, showing different angular positions of the inner rotor and its eccentric support with reference to the stationary outer rotor.

The internal combustion engine shown in the drawing comprises a power shaft 10 whose axis has been designated X and which axially traverses a stationary shell constituted by a peripheral wall 11 (hereinafter referred to as "outer rotor") and a pair of adjoining end walls 12, 13. Rotor 11, whose inner wall surface is formed with four lobes 11A, 11B, 11C and 11D (FIG. 6), is centered on the axis X and surrounds an inner rotor 14 of pentagonal shape with five corners 14a, 14b, 14c, 14d and 14e. Rotor 14 is centered on axis Y defined by a cylindrical support 15 whose eccentric bore 15' is coaxial with shaft 10 and receives the latter with slight all-around clearance. Suitable antifriction bearing means, such as rollers 16, can be placed in this clearance if desired.

Rigid and concentric with inner rotor 14, to which it is secured by pins 17 and screws 18, is a ring gear 19 whose teeth 19' mesh with the teeth 20' of a spur gear 20 fixed to the wall 12 by a screw 21 and a pin 22 so as to be centered on axis X. As best seen in FIG. 6, gears 19 and 20 have a tooth ratio of 5:4 whereby the point of contact between these gears rotates five times about the axis X whenever gear 19 (and therefore the movable rotor 14) performs a full revolution with reference to the stationary rotor 11. By virtue of this relationship, each corner 14a–14e of rotor 14 executes a complete radial reciprocation between a proximal position with reference to axis X, i.e. the position of corner 14A in FIG. 6, and a distal position, slightly beyond that occupied by the corners 14C and 14D in this figure, in the course of an engine cycle defined as a rotation of rotor 14 through an angle of 72° (e.g. from the position of FIG. 6 to that of FIG. 6A). Each corner, therefore, closely sweeps a major part of an adjoining lobe during such cycle, rotor 14 being fitted with slides 24a, 24b, 24c, 24d and 24e at the respective corners which insure tight contact with the inner peripheral surface of rotor 11 and which are urged radially outwardly by the centrifugal force supplemented, in the specific system illustrated, by the resiliency of a pair of elastic rings 23', 23" which engage in lateral slots of all five slides. The radial reciprocation of rotor 14 is accompanied and facilitated by a full revolution of eccentric 15 which therefore rotates five times as fast as the rotor 14 from which it is separated by a set of bearing rollers 28.

One of the walls bounding the lobes 11A–11D, here the wall 13, is formed with inlet and outlet ports for a combustible mixture, i.e. inlet ports 25' (FIGS. 6 and 6C), 25" (FIGS. 6A and 6B) and outlet ports 26' (FIGS. 6 and 6A), 26" (FIGS. 6B and 6C). The ports 25', 25" are located at the entrance ends of lobes 11A and 11C whereas the ports 26', 26" are disposed at the exit ends of lobes 11D and 11B, respectively, clockwise rotation being assumed for the elements 10, 14 and 15. In addition, igniters 27', 27" (here shown as pair of spark plugs) are located at diametrically opposite positions at the entrance ends of lobes 11B and 11D.

Rigidly connected with inner rotor 14, through the intermediary of screws 18, are two annular members 29 and 30 formed with confronting recesses 29' and 30', respectively, to serve as housings for an array of five planetary gears 31a, 31b, 31c, 31d and 31e of stepped configuration. The screws 18 are surrounded by spacers 32 to provide clearance for the toothed portions 31', 31" of each planetary gear, these two portions having the same number of teeth (eleven in the specific embodiment illustrated) but being of different diameter. The gudgeons of planetary gears 31a etc. are journaled in recesses 29' and 30' with the aid of bearing rollers 33 and 34, respectively. As will be apparent from a comparison of FIGS. 5 and 6, the location of gears 31a–31e is so chosen that each of them is on a common radius with a respective corner slide 24a–24e of rotor 14.

Fixedly secured by a screw 35 and a pin 36 to the wall 13 of the stationary shell 11–13, and thus rigid with outer rotor 11, is a ring 37 whose inner periphery is formed with toothed zones 37A, 37B, 37C and 37D which are respectively centered on the bisectors of the four lobes 11A–11D. The zones 37A–37D thus constitute segments of an internally toothed annular gear centered on the axis X and proportioned to mesh intermittently and consecutively with the large-diameter portion 31' of each of the planetary gears 31a–31e as the eccentric 15 goes through a full revolution. As best seen in FIG. 5, the dimensioning of the inner diameter of ring 37 is such that two adjacent planetary gears (i.e. gears 31c and 31d in the illustrated position) can concurrently coact with respective segments (37B, 37C), the length of these segments being so chosen that the leading planetary gear (31d) begins to engage the teeth of its segments when the trailing planetary gear (31c) moves out of contact with the segment previously engaged thereby. The small-diameter portions 31" of all planetary gears are in constant mesh with internal teeth 38' of a floating ring gear 38 which is supported by rollers 39 on the outer periphery of rotor member 30. All the planetary gears, accordingly, rotate in unison and continuously so that the length of the segments 37A–37D is not critical except for the requirement that the minimum number of their teeth must be sufficient to keep at least one planetary gear engaged in every relative position of the two rotors.

The teeth 38' of ring gear 38, which is centered on the axis Y, are also in mesh with teeth 40' of a further gear 40 which is carried on a splined extension 10' of shaft 10. Bearing rollers 41, 42 and 43, similar to rollers 28 which support the rotor members 14 and 29, are interposed between eccentric 15 and wall 12, rotor member 30 and gear 40, respectively, to insure free rotatability of the eccentric. A washer 44 on eccentric 15 separates the rollers 42 from the rollers 43.

Where necessary, the rotating elements may be balanced by suitable weights (not shown) to insure their smooth rotation.

As indicated in FIG. 6, the curvature of each lobe 11A–11D may be represented, with good approximation to the trajectory of corners 14a–14e, by a circular arc curved about a center O as particularly shown for the lobe 11D. The high point of the lobe, i.e., the one of greatest distance from axis X, has been designated P whereas the low point of the inner rotary periphery, at the junction of adjoining lobes, has been indicated at Q. The triangle O–P–Q is nearly equilateral, the optimum angle at O measuring 63° 15'2" whereas the corresponding angle at Q is 58°22'20". The locus of all four points O is a circle centered on axis X.

The difference between the maximum radius O–P of the inner rotor 11 and its minimum radius O–Q equals 2e, e being the eccentricity of the system represented by the distance between axes X and Y.

The pentagonal outer periphery of rotor 14 is also composed of a series of circular arcs (ten in all), of radius R, which, as particularly illustrated for the trailing flank of peak 14b, are curved about respective centers U whose locus is centered on axis Y. The arcs of radius R are interconnected, in the regions of the four vertices Q, by arcs of reverse curvature having a radius r. The relative proportions of the various radii may be as follows, based upon an eccentricity of $e=8.75$ units (e.g. millimeters):

$$O-P = 97.2$$
$$R = 167.25$$
$$Y-U = 57.75$$
$$r = 94$$

In this particular system, the distance of the axes of planetary gears $31a$–$31e$ from their central axis $Y$ is advantageously 59.5, with the root radius of the toothed sections 37A–37D equal to 90.25; the ratio of the diameters of planetary-gear portions 31' and 31" may be 8:7.

In such a system the volume of each rotor chamber, i.e. of the space defined between successive corners such as 14a and 14b, varies between a maximum (top in FIG. 6) and a minimum (bottom in FIG. 6) whose ratio may be as high as 15:1. This ratio may be reduced to any desired extent by departing from the rotor configurations described above, as by recessing the inner rotor 14 as illustrated at 45 in FIG. 6. This depression 45, located just ahead of each corner as seen in the direction of rotation of inner rotor 14, also serves to concentrate the combustible mixture in the forward end of each rotor chamber for a more favorable distribution of its thrust.

In the specific embodiment illustrated, the number of teeth 19' and 20' of gears 19 and 20 is twenty-five and twenty, respectively, the number of teeth 38' on ring gear 38 being forty-five while the number of teeth 40' on gear 40 is forty. The annular gear composed of segments 37A–37D, if continuous, could have 80 teeth so that its pitch would be twice that of gear 40; with the gear portions 31' and 31" having the same number of teeth (eleven), the transmission ratio of the gear train 37–31'–31"–38–40 is 1:2 so that gear 40 and shaft 10 spin at twice the speed of rotor 14 in the direction in which the stationary ring 37 turns with reference to that rotor, thus in a direction opposite that of rotor 14 with reference to rotor 11 whereby the absolute speed of shaft 10 will be equal and opposite to that of rotor 14.

In operation, when the rotor 14 is in the position of FIG. 6 or in any of its four geometrically identical other positions, a combustible fuel/air mixture is admitted into lobe 11A through port 25' for subsequent confinement in the rotor chamber with obstruction of the port 25' (FIG. 6A), compression of the mixture (FIG. 6B) and ignition by spark plug 27' (FIG. 6C), the combusion products escaping through port 26" as the rotor chamber registers therewith after a further engine cycle. In staggered relationship therewith, combustible mixture is admitted through port 25" in the position of FIG. 6B and, two engine cycles later, is expelled through port 26' in a position identical with that of FIG. 6A after the triggering of an explosion by spark plug 27". By virtue of the synchronization of the rotations of shaft 10 and rotor 14, the actuation of the spark plugs or equivalent ignition-promoting means can be readily controlled by switch contacts (not shown) operated by this shaft.

I claim:

1. A rotary engine comprising an inner rotor, an outer rotor and an eccentric support for said inner rotor all rotatable relatively to one another, said support sharing a first axis of rotation with said outer rotor and defining a second axis of rotation parallel to said first axis for said inner rotor, said outer rotor forming a closed shell around said inner rotor with an inner peripheral wall having $n$ peripherally equispaced lobes of generally epitrochoidal configuration, said inner rotor having an outer peripheral wall formed substantially as a regular polygon with $n+1$ corners slidingly contacting said inner peripheral wall, coupling means interlinking said outer rotor and said inner rotor for rotation relative to said support at respective angular velocities being in a ratio of $(n+1) : n$ whereby said corners are constrained to slide along said inner peripheral wall, conduit means opening into said shell for the admission and expulsion of a working fluid at certain of said lobes, a circular array of at least $n+1$ planetary gears centered on said second axis and mounted on said inner rotor for independent rotation, annular gear means rigid with said outer rotor centered on said first axis and positioned for staggered co-operation with said planetary gears upon relative rotation of said rotors, a ring gear centered on said second axis in constant mesh with all said planetary gears, and a power shaft coupled with said ring gear.

2. An engine as defined in claim 1 wherein said annular gear means comprises $n$ separate toothed arc segments aligned with respective lobes and centered on the regions of greatest depth thereof.

3. A rotary engine comprising an inner rotor, an outer rotor and an eccentric support for said inner rotor all rotatable relatively to one another, said support sharing a first axis of rotation with said outer rotor and defining a second axis of rotation parallel to said first axis for said inner rotor, said outer rotor forming a closed shell around said inner rotor with an inner peripheral wall having four peripherally equispaced lobes of generally epitrochoidal configuration, said inner rotor having an outer peripheral wall formed substantially as a regular pentagon slidingly contacting said inner peripheral wall at its five corners, coupling means interlinking said outer rotor and said inner rotor for rotation relative to said support at respective angular velocities being in a ratio of 5:4 whereby said corners are constrained to slide along said inner peripheral wall, conduit means opening into said shell for the admission and expulsion of a working fluid at certain of said lobes, a circular array of five equispaced planetary gears centered on said second axis and mounted on said inner rotor for independent rotation, annular gear means rigid with said outer rotor centered on said first axis and positioned for staggered co-operation with said planetary gears upon relative rotation of said rotors, a ring gear centered on said second axis in constant mesh with all said planetary gears, and a power shaft coupled with said ring gear.

4. An engine as defined in claim 3 wherein said lobes are defined by circular arcs.

5. A rotary engine comprising an inner rotor, an outer rotor and an eccentric tubular support for said inner rotor all rotatable relatively to one another, said support sharing a first axis of rotation with said outer rotor and defining a second axis of rotation parallel to said first axis for said inner rotor, said outer rotor forming a closed shell around said inner rotor with an inner peripheral wall having $n$ peripherally equispaced lobes of generally epitrochoidal configuration, said inner rotor having an outer peripheral wall formed substantially as a regular polygon with $n+1$ corners slidingly contacting said inner peripheral wall, coupling means interlinking said outer rotor and said inner rotor for rotation relative to said support at respective angular velocities being in a ratio of $(n+1) : n$ whereby said corners are constrained to slide along said inner peripheral wall, conduit means opening into said shell for the admission and expulsion of a working fluid at certain of said lobes, a circular array of at least $n+1$ planetary gears centered on said second axis and mounted on said inner rotor for independent rotation, annular gear means rigid with said outer rotor centered on said first axis and positioned for staggered co-operation with said planetary gears upon relative rotation of said rotors, a ring gear centered on said axis in constant mesh with all said planetary gears, a power shaft centered on said first axis and traversing said tubular support with freedom of relative rotation, and a further gear on said shaft in mesh with said ring gear.

6. An engine as defined in claim 5 wherein said planetary gears are stepped and have small-diameter toothed portions embraced by said ring gear and large-diameter toothed portions surrounded by said annular gear means for engagement therewith whereby said inner rotor and said shaft rotate in opposite directions relatively to said outer rotor.

7. An engine as defined in claim 6 wherein said large-diameter portions and said small-diameter portions have the same number of teeth.

8. An engine as defined in claim 6 wherein said annular gear means, said planetary gears, said ring gear and said further gear have tooth ratios maintaining the absolute rate of rotation of said inner rotor, relative to said outer rotor, equal to that of said shaft.

9. A rotary engine comprising an inner rotor, an outer rotor and an eccentric tubular support for said inner rotor all rotatable relatively to one another, said support sharing a first axis of rotation with said outer rotor and defining a second axis of rotation parallel to said first axis for said inner rotor, said outer rotor forming a closed shell around said inner rotor with an inner peripheral wall having four peripherally equispaced lobes of generally epitrochoidal configuration, said inner rotor having an outer peripheral wall formed substantially as a regular pentagon slidingly contacting said inner peripheral wall at its five corners, coupling means interlinking said outer rotor and said inner rotor for rotation relative to said support at respective angular velocities being in a ratio of 5:4 whereby said corners are constrained to slide along said inner peripheral wall, conduit means opening into said shell for the admission and expulsion of a working fluid at certain of said lobes, a circular array of five equispaced planetary gears centered on said second axis and mounted on said inner rotor for independent rotation, annular gear means rigid with said outer rotor centered on said first axis and positioned for staggered co-operation with said planetary gears upon relative rotation of said rotors, a ring gear centered on said second axis in constant mesh with all said planetary gears, a power shaft centered on said first axis and traversing said tubular support with freedom of relative rotation, and a further gear on said shaft in mesh with said ring gear.

10. An engine as defined in claim 9 wherein said planetary gears have toothed portions of like pitch in mesh with said ring gear and engageable with said annular gear means, respectively, the latter being located externally of said planetary gears and having twice the pitch of said further gear whereby said inner rotor and said shaft rotate at equal and opposite speeds relative to said outer rotor.

11. An internal-combustion engine comprising an inner rotor, an outer rotor and an eccentric support for said inner rotor all rotatable relatively to one another, said support sharing a first axis of rotation with said outer rotor and defining a second axis of rotation parallel to said first axis for said inner rotor, said outer rotor forming a closed shell around said inner rotor with an inner peripheral wall having four peripherally equispaced lobes of generally epitrochoidal configuration, said inner rotor having an outer peripheral wall formed substantially as a regular pentagon slidingly contacting said inner peripheral wall at its five corners, coupling means interlinking said outer rotor and said inner rotor for rotation relative to said support at respective angular velocities being in a ratio of 5:4 whereby said corners are constrained to slide along said inner peripheral wall, conduit means opening into said shell for the admission of a combustible mixture at alternate lobes and expulsion of combustion gases at the remaining lobes, a circular array of five equispaced planetary gears centered on said second axis and mounted on said inner rotor for independent rotation, annular gear means rigid with said outer rotor centered on said first axis and positioned for staggered co-operation with said planetary gears upon relative rotation of said rotors, a ring gear centered on said second axis in constant mesh with all said planetary gears, and a power shaft coupled with said ring gear.

12. An engine as defined in claim 11 wherein said outer peripheral wall is recessed just ahead of each corner as seen in its direction of rotation relative to said outer rotor.

No references cited.

SAMUEL LEVINE, *Primary Examiner.*